United States Patent
West et al.

(10) Patent No.: US 9,410,479 B2
(45) Date of Patent: Aug. 9, 2016

(54) METHOD FOR ADJUSTING THE OPERATION OF A TURBOMACHINE RECEIVING A RECIRCULATED EXHAUST GAS

(75) Inventors: James A. West, Simpsonville, SC (US); Rex A. Morgan, Simpsonville, SC (US); Lewis B. Davis, Jr., Niskayuna, NY (US); Sam D. Draper, Simpsonville, SC (US); Amit Toprani, Greenville, SC (US)

(73) Assignee: General Electric Company, Schenectady, NY (US)

( * ) Notice: Subject to any disclaimer, the term of this patent is extended or adjusted under 35 U.S.C. 154(b) by 2359 days.

(21) Appl. No.: 11/959,975

(22) Filed: Dec. 19, 2007

(65) Prior Publication Data

US 2009/0158734 A1 Jun. 25, 2009

(51) Int. Cl.
*F02C 3/34* (2006.01)
*F01K 23/10* (2006.01)
*F02C 9/16* (2006.01)

(52) U.S. Cl.
CPC .............. *F02C 3/34* (2013.01); *F01K 23/101* (2013.01); *F02C 9/16* (2013.01); *F05D 2270/303* (2013.01); *Y02E 20/16* (2013.01)

(58) Field of Classification Search
CPC .............. F02C 3/34; F02C 1/08; F02C 9/16; F01D 25/30; F01K 23/101
USPC ................ 60/39.52, 39.5, 793, 272
See application file for complete search history.

(56) References Cited

U.S. PATENT DOCUMENTS

| | | | | |
|---|---|---|---|---|
| 6,202,400 | B1 * | 3/2001 | Utamura et al. | 60/773 |
| 6,843,055 | B2 * | 1/2005 | Ootake | 60/297 |
| 6,895,752 | B1 * | 5/2005 | Holtman et al. | 60/605.2 |
| 2002/0043063 | A1 * | 4/2002 | Kataoka et al. | 60/39.182 |
| 2004/0065088 | A1 * | 4/2004 | Viteri et al. | 60/772 |
| 2004/0123601 | A1 | 7/2004 | Fan | |
| 2005/0066659 | A1 * | 3/2005 | Super et al. | 60/605.2 |
| 2005/0076645 | A1 * | 4/2005 | Frutschi et al. | 60/772 |

FOREIGN PATENT DOCUMENTS

| | | |
|---|---|---|
| CN | 1207453 A | 2/1999 |
| JP | 11050811 A | 2/1999 |
| JP | 2003222043 A | 8/2003 |

OTHER PUBLICATIONS

Office Action from JP Application No. 2008-315244 dated Feb. 19, 2013, along with unofficial translation.
Search Report and Written Opinion from CN Application No. 200810183983.1 dated Oct. 19, 2012.

* cited by examiner

*Primary Examiner* — Craig Kim
(74) *Attorney, Agent, or Firm* — Ernest G. Cusick; Frank A. Landgraff

(57) ABSTRACT

A method for adjusting the operation of a turbomachine integrated with an exhaust gas recirculation (EGR) system is provided. The method may utilize the composition of an inlet fluid entering the turbomachine. The method may also utilize a variety of turbomachine operating data.

13 Claims, 4 Drawing Sheets

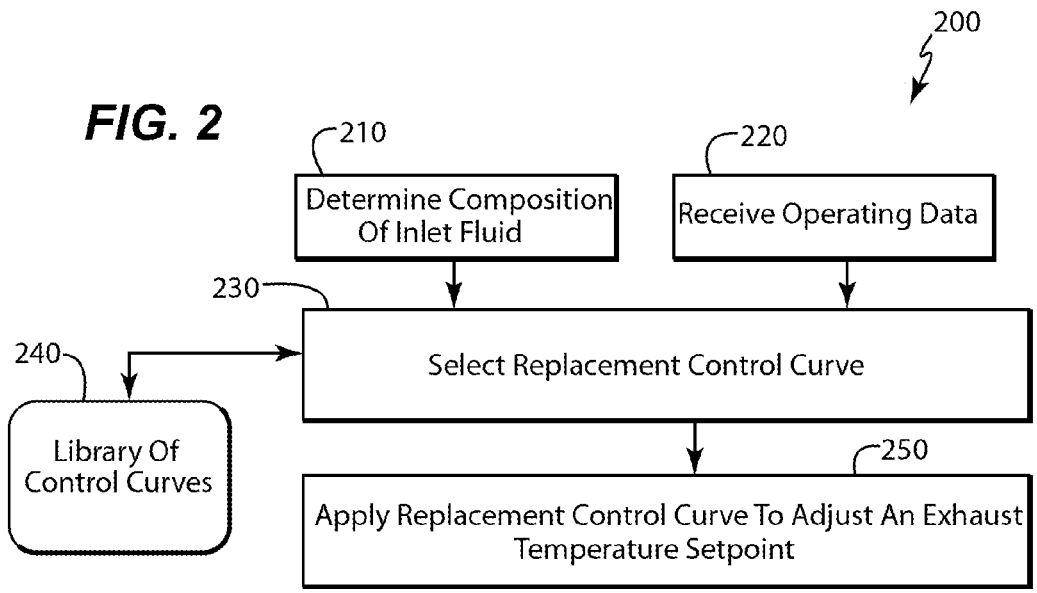
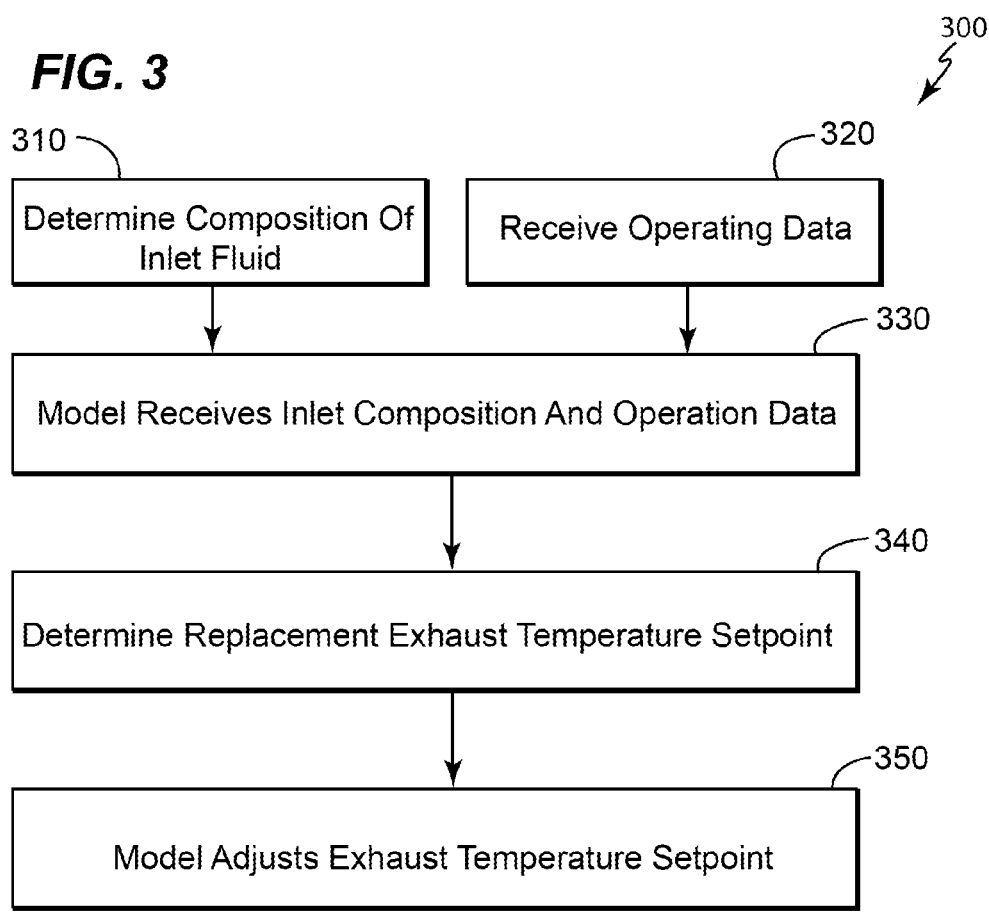

METHOD FOR ADJUSTING THE OPERATION OF A TURBOMACHINE RECEIVING A RECIRCULATED EXHAUST GAS

BACKGROUND OF THE INVENTION

This application is related to commonly-assigned U.S. patent application Ser. No. 11/928,038, filed Oct. 30, 2007.

The present invention relates to an exhaust gas recirculation system, and more particularly to a method and system for adjusting turbomachine operation after exhaust gas reenters a portion of the turbomachine.

There is a growing concern over the long-term effects of Nitrogen Oxides (hereinafter NOx) and Carbon Dioxide (hereinafter "$CO_2$") and Sulfur Oxides (SOx) emissions on the environment. The allowable levels of emissions that may be emitted by a turbomachine, such as a gas turbine are heavily regulated. Operators of turbomachines desire methods of reducing the levels of NOx, $CO_2$ and SOx emitted.

Significant amounts of condensable vapors exist in the exhaust gas stream. These vapors usually contain a variety of constituents such as water, acids, aldehydes, hydrocarbons, sulfur oxides, and chlorine compounds. Left untreated, these constituents will accelerate corrosion and fouling of the internal components if allowed to enter the gas turbine.

Exhaust gas recirculation (EGR) generally involves recirculating a portion of the emitted exhaust through an inlet portion of the turbomachine where it is mixed with the incoming airflow prior to combustion. This process facilitates the removal and sequestration of concentrated $CO_2$, and also reduces the NOx emission levels.

There are a few problems with the currently known EGR systems. When the recirculated exhaust mixes with inlet air (forming an inlet fluid) and enters the turbomachine, the specific heat at constant pressure (Cp) is noticeably different than the Cp of the inlet air. Moreover, the relationship between firing temperature and exhaust temperature is altered proportionally to the change in Cp. When the turbomachine is controlled to a given exhaust temperature, the higher Cp will result in a lower firing temperature at the inlet to the turbine which will severely affect the efficiency and heat rate of the machine.

A turbomachine is generally operated according to a control curve, or similar model which incorporates turbomachine operating data including the exhaust temperature, compressor pressure ratio, and the like. The control of the turbomachine generally relies on relatively fixed compositions of the inlet fluid in order to maintain optimum efficiency and heat rate. The current control methodology generally does not account for the relationship change between firing temperature and exhaust temperature due to the recirculated exhaust.

For the foregoing reasons, there is a need for a method of adjusting the operation of a turbomachine while an EGR system operates. The method should allow for maintaining the desired firing temperature range. The method should also allow for integrating the operation of the EGR system with the adjustment of the firing temperature.

BRIEF DESCRIPTION OF THE INVENTION

In accordance with an embodiment of the present invention, a method of adjusting the operation of a turbomachine, wherein the turbomachine generates an exhaust stream and comprises an inlet section; the method comprising: providing at least one exhaust gas recirculation (EGR) system comprising: at least one EGR flow conditioning device and at least one flow control device; wherein the EGR recirculates the exhaust stream to an inlet section of the turbomachine; determining a composition of an inlet fluid; wherein the composition comprises the at least one constituent; and adjusting an exhaust temperature setpoint of the turbomachine based on the composition of the inlet fluid.

In accordance with an alternate embodiment of the present invention, a method of adjusting the operation of a turbomachine, wherein the turbomachine generates an exhaust stream and comprises an inlet section; the method comprising: providing at least one exhaust gas recirculation (EGR) system comprising: at least one EGR flow conditioning device and at least one flow control device; wherein the EGR recirculates the exhaust stream to an inlet section of the turbomachine; and utilizing a turbomachine operating model for determining a firing temperature of the turbomachine, wherein the turbomachine operating model incorporates a plurality of turbomachine operating data.

BRIEF DESCRIPTION OF THE DRAWINGS

FIG. 2 is a flowchart illustrating an example of a method of adjusting the operation of a turbomachine in accordance with a first embodiment of the present invention.

FIG. 3 is a flowchart illustrating an example of a method of adjusting the operation of a turbomachine in accordance with a second embodiment of the present invention.

DETAILED DESCRIPTION OF THE INVENTION

The following detailed description of preferred embodiments refers to the accompanying drawings, which illustrate specific embodiments of the invention. Other embodiments having different structures and operations do not depart from the scope of the present invention.

Certain terminology is used herein for the convenience of the reader only and is not to be taken as a limitation on the scope of the invention. For example, words such as "upper," "lower," "left," "right," "front", "rear" "top", "bottom", "horizontal," "vertical," "upstream," "downstream," "fore", "aft", and the like; merely describe the configuration shown in the Figures. Indeed, the element or elements of an embodiment of the present invention may be oriented in any direction and the terminology, therefore, should be understood as encompassing such variations unless specified otherwise.

An EGR rate may be considered the rate and quantity of the exhaust stream that enters the inlet section of the turbomachine. The composition of the inlet fluid includes the concentration of at least one of the constituents and/or the Cp of the inlet fluid. The EGR fraction may be considered the amount, such as, but not limiting of, a percentage of the exhaust stream within the inlet fluid. EGR fraction may be determined by dividing the mass flowrate of the exhaust stream by the mass flowrate of the inlet air. EGR fraction may also be determined by dividing the EGR flow by the mixed compressor inlet flow.

The present invention has the technical effect of adjusting the operation of a turbomachine to account for a change in the composition of the inlet fluid. As discussed below and illustrated in FIGS. 2 through 4, the present invention may utilize the composition of the inlet fluid and the turbomachine operating data to adjust the exhaust temperature setpoint to maintain the firing temperature of the turbomachine.

The present invention may be applied to the variety of turbomachines that produce a gaseous fluid, such as, but not limiting of a heavy duty gas turbine: an aero-derivative gas turbine; or the like (hereinafter referred to as "gas turbine"). An embodiment of the present invention may be applied to either a single gas turbine or a plurality of gas turbines. An embodiment of the present invention may be applied to a gas turbine operating in a simple cycle or a combined cycle configuration.

Figure 1:
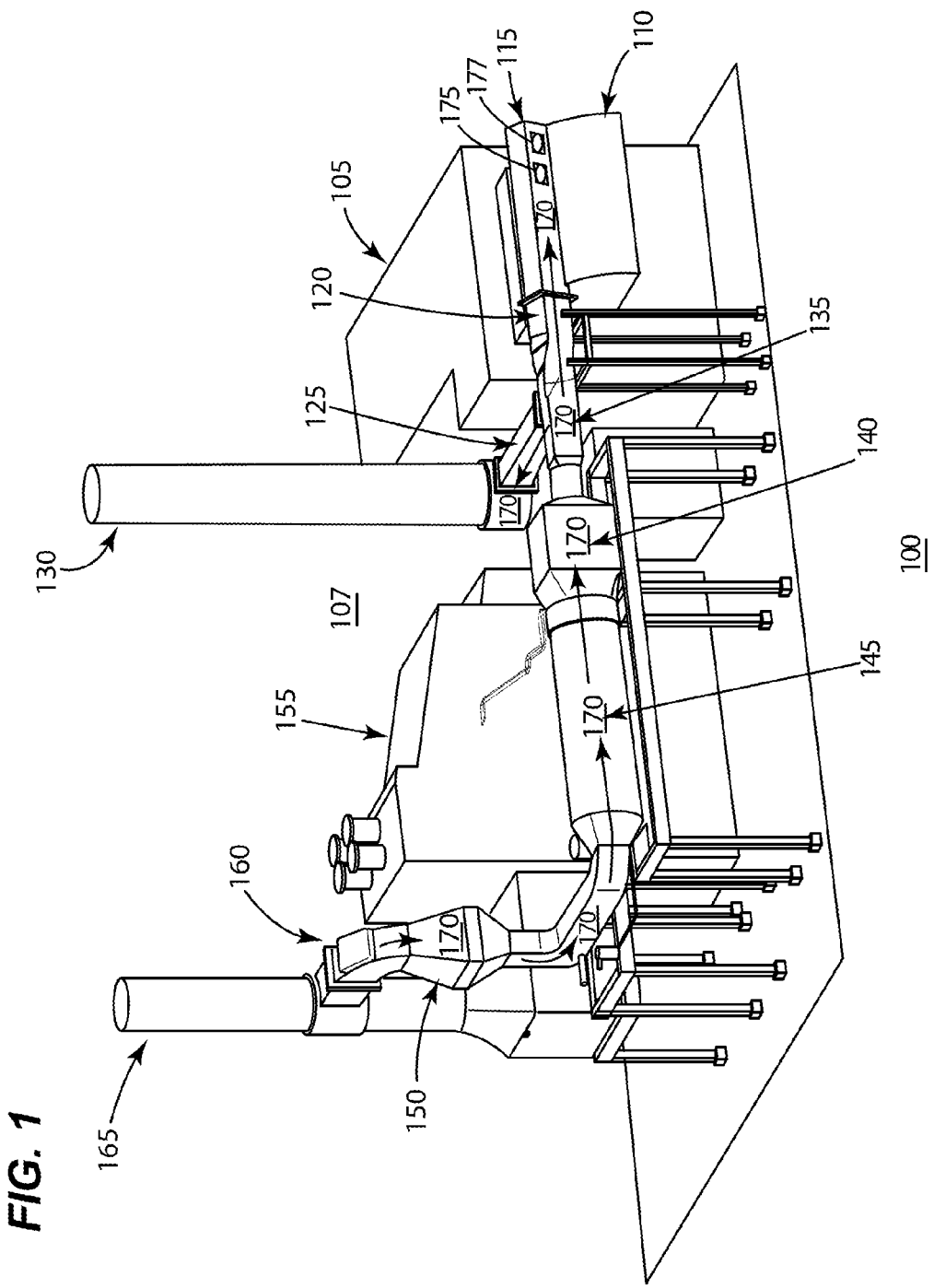
FIG. 1 is a schematic illustrating the environment in which an embodiment of the present invention operates.

Referring now to the Figures, where the various numbers represent like elements throughout the several views, FIG. 1 is a schematic illustrating the environment in which an embodiment of the present invention operates. FIG. 1 illustrates a site 100, such as but not limiting of a powerplant site, having a turbomachine 105, an EGR system 107, a heat recovery steam generator (HRSG) 155, and an exhaust stack 165. Alternatively, the present invention may be integrated with a site 100 not having the HRSG 155.

The EGR system 107 comprises multiple elements. The configuration and sequence of these elements may be dictated by the composition of the exhaust stream 170 and the type of cooling fluid used by the components of the EGR system 107. Furthermore, alternate embodiments of the EGR system 107 may include additional or fewer components than the components described below. Therefore, various arrangements, and/or configurations, which differ from FIG. 1, may be integrated with an embodiment of the present invention.

As illustrated in FIG. 1, the EGR system 107 comprises: a mixing station 115, an inlet modulation device 120, a bypass modulation device 125, a bypass stack 130, at least one EGR flow conditioning device 135, a downstream temperature conditioning device 140, a constituent reduction system 145, a upstream temperature conditioning device 150, at least one exhaust modulation device 160, and at least one EGR feedback device 175.

Generally, the process used by the EGR system 107 may include: cooling of the exhaust stream 170; reduction and removal of the aforementioned constituents within the exhaust stream 170; and then mixing of the exhaust stream 170 with the inlet air, which forms an inlet fluid; which flows from the inlet section 110 through to the exhaust stack 165. The EGR system 107 may reduce the temperature of the exhaust stream 170 to a saturation temperature where the aforementioned constituents may condense and then be removed. Alternatively, the EGR system 107 may also reduce the temperature of, and use a scrubbing process (or the like) on, the exhaust stream 170 to remove the aforementioned constituents.

As will be appreciated, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit", "module," or "system". Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++, or the like. However, the computer program code for carrying out operations of the present invention may also be written in conventional procedural programming languages, such as the "C" programming language, or a similar language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a public purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block The present invention may include a control system, or the like, configured to automatically or continuously monitor the exhaust stream 170 of the turbomachine 105 to determine the composition of the inlet fluid entering the inlet section 110. Alternatively, the control system may be configured to require a user action to the initiate operation. An embodiment of the control system of the present invention may function as a stand-alone system. Alternatively, the control system may be integrated as a module, or the like, within a broader system, such as a turbine control or a plant control system. For example, but not limiting of, the control system of the present invention may be integrated with the control system operating the EGR system 107.

Referring now to FIG. 2, which is a flowchart illustrating an example of a method 200 of adjusting the operation of a turbomachine in accordance with a first embodiment of the present invention. In an embodiment of the present invention the EGR system 107 may be integrated with a graphical user interface (GUI), or the like. The GUI may allow the operator to navigate through the method 200 described below. The GUI may also provide at least one notification of the status of the method 200.

In step 210, the method 200 may determine the composition of the inlet fluid. As discussed, the inlet fluid comprises the exhaust stream 170 and the inlet air. The composition of the inlet fluid may include the EGR fraction and/or the Cp.

While EGR system 107 is in operation the exhaust stream 170 may be continuously monitored by at least one for the following or similar methods. The at least one EGR feedback device 175 may measure the EGR rate of the exhaust stream 170. Alternatively, a first EGR feedback device 175 may measure the concentration of at least one constituent, such as but not limiting of, $CO_2$ within the exhaust stream 170 and a second EGR feedback device 177 may measure the humidity concentration within the exhaust stream 170. As illustrated in FIG. 1, the at least one EGR feedback device 175 may be positioned adjacent the inlet section 110 of the turbomachine 105.

If the site 100 does not include the at least one EGR feedback device 175, the present invention allows for receiving data on the EGR rate from a separate system. The system may include at least one of: an EGR control system, a turbine control system, a site control system, or combinations thereof.

In step 220, the method 200 may receive turbomachine operating data. The method 200 may utilize the turbomachine operating data when determining the appropriate exhaust temperature setpoint. The turbomachine operating data may include the compressor pressure ratio and the exhaust temperature of the turbomachine 105. The method 200 may receive the turbomachine operating data from a separate system. The system may include at least one of: an EGR control system, a turbine control system, a site control system, or combinations thereof.

In step 230, the method 200 may select a replacement control curve for the turbomachine 105. As discussed, the control curve may be configured for a specific inlet condition. A change in inlet condition may require a new control curve to maintain the efficiency and heat-rate of the turbomachine 105. An embodiment of the present invention may provide a family of control curves to cover a range of inlet compositions. The family of control curves may include a specific control curve for a specific EGR fraction. For example, but not limiting of, control curve X may cover an EGR fraction of 5%, and control curve Y may cover an EGR fraction of 10%. The family of control curves may be stored in a control curve library, or the like.

Furthermore, in step 240, the method 200 may provide the specific control curve selected in step 230 from the library of control curves. The library of control curves may be stored locally or may be stored for example, but not limiting of, in at least one of: an EGR control system, a turbine control system, a site control system, or combinations thereof. In an embodiment of the present invention, the GUI may provide a notification to the user if the control curve should be and/or has been replaced.

In step 250, the method 200 may apply the replacement control curve to the turbomachine 105. The replacement control curve may then adjust the exhaust temperature setpoint. In an alternate embodiment of the present invention, the desired exhaust temperature setpoint may lie between a first control curve and a second control curve. Here, the method 200 may interpolate between the first and second control curves to select the appropriate exhaust temperature setpoint.

Referring now to FIG. 3, which is a flowchart illustrating an example of a method 300 of adjusting the operation of a turbomachine in accordance with a second embodiment of the present invention. In steps 310 and 320, the method 300 may perform operations similar to steps 210 and 220, as previously described.

In step 330 the inlet composition of step 310 and the turbomachine operating data of step 320 may be received as inputs to a turbomachine operating model. If a control system of a turbomachine 105 utilizes a turbomachine operating model, the control curves may not be utilized. In an alternate embodiment of this second embodiment of the present invention. The aforementioned method 200 utilizing a family of control curves may be used as a back up to the turbomachine operating model.

In step 340, the method 300 may determine a new exhaust temperature setpoint based on the inlet condition and turbomachine operating data. In an embodiment of the present invention, the GUI may provide a notification to the user if the exhaust temperature setpoint should be adjusted.

In step 350, the method 300 may adjust the exhaust temperature setpoint. In an embodiment of the present invention, the GUI may provide a notification to the user if the exhaust temperature setpoint has been adjusted.

In an alternate embodiment of the method 300, the turbomachine operating model may determine the EGR fraction. Here, the turbomachine operating model may receive and monitor a plurality of turbomachine operating data. The turbomachine operating model may include for example, but not limiting of, compressor pressure ratio, exhaust temperature, turbomachine output data (generator output, or the like), and position data on at least one EGR valve. Upon detecting a change in the turbomachine operating data, the turbomachine operating model may determine the current EGR fraction. Next, the turbomachine operating model may adjust the exhaust temperature setpoint as described.

Figure 4:
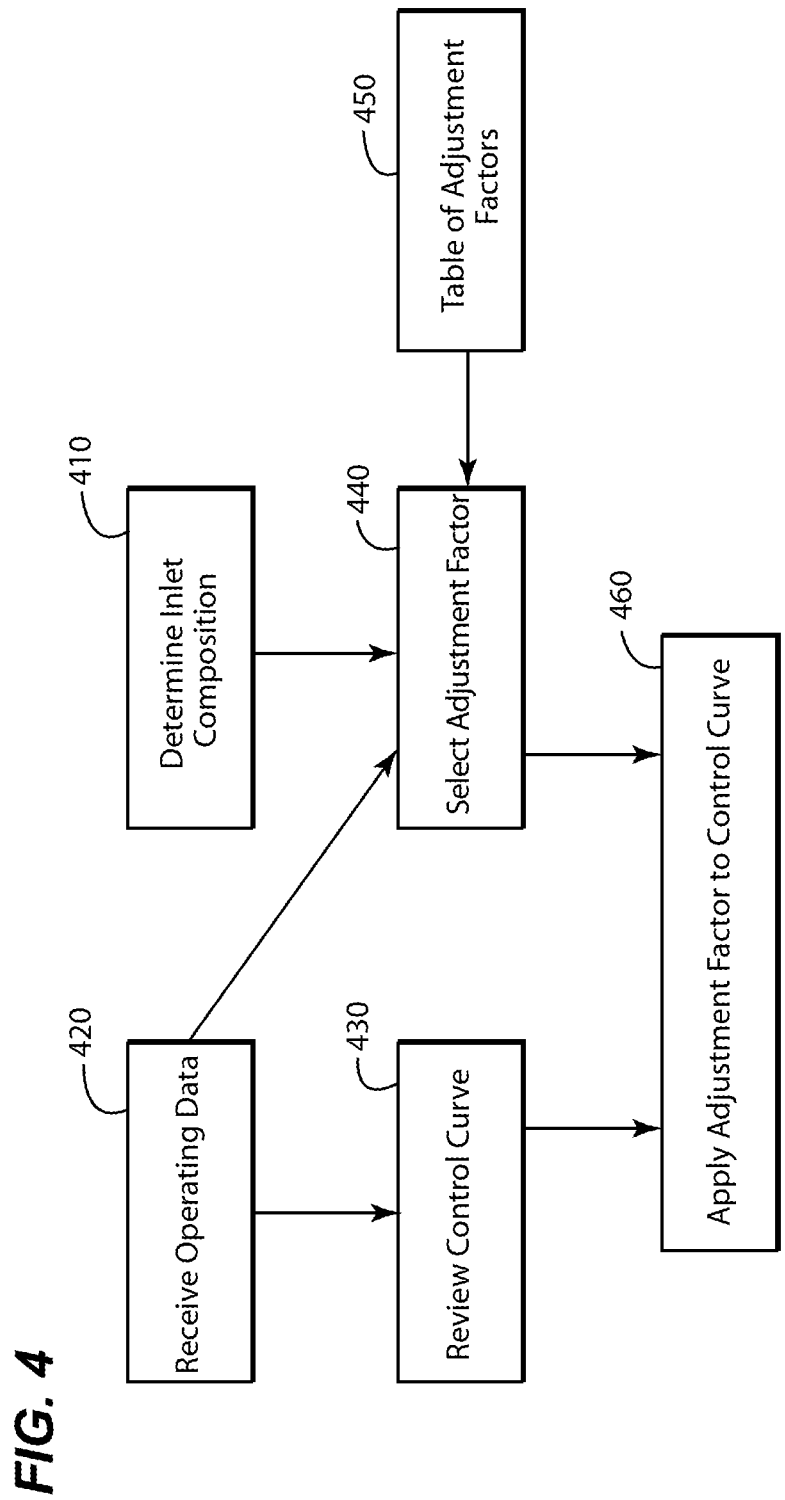
FIG. 4 is a flowchart illustrating an example of a method of adjusting the operation of a turbomachine in accordance with a third embodiment of the present invention.

Referring now to FIG. 4, which is a flowchart illustrating an example of a method 400 of adjusting the operation of a turbomachine in accordance with a second embodiment of the present invention. In steps 410 and 420, the method 400 may perform operations similar to steps 210 and 220, as previously described.

In step 430, the method 400 may review the current control curve. Here, the method 400 may compare the current exhaust temperature setpoint with the exhaust temperature setpoint required for the inlet conditions and turbomachine operating data. Generally a control curve may be adjusted by applying an adjustment factor, which may change the exhaust temperature setpoint. In an embodiment of the present invention, the GUI may provide a notification to the user if the exhaust temperature setpoint should be and/or has been adjusted.

In step 40, the method 400 may select an appropriate adjustment factor for the received inlet conditions and turbomachine operating data. An embodiment of the present invention may provide a plurality of adjustment factors to cover a range on inlet compositions. The plurality of adjustment factors may include adjustment factors for a specific EGR fraction. For example, but not limiting of, adjustment factor X may cover an EGR fraction of 5%, and adjustment factor Y may cover an EGR fraction of 10%. The plurality of adjustment factors may be stored in a table of adjustment factors, or the like.

Furthermore, in step 450, the method 400 may provide the specific adjustment factor selected in step 440 from the table of adjustment factors. The table of adjustment factors may be stored locally or may be stored for example, but not limiting of, in at least one of: an EGR control system, a turbine control system, a site control system, or combinations thereof.

In step 460, the method 400 may apply the adjustment factor to the control curve. In an embodiment of the present invention, the GUI may provide a notification to the user if the adjustment factor was replaced.

Figure 5:
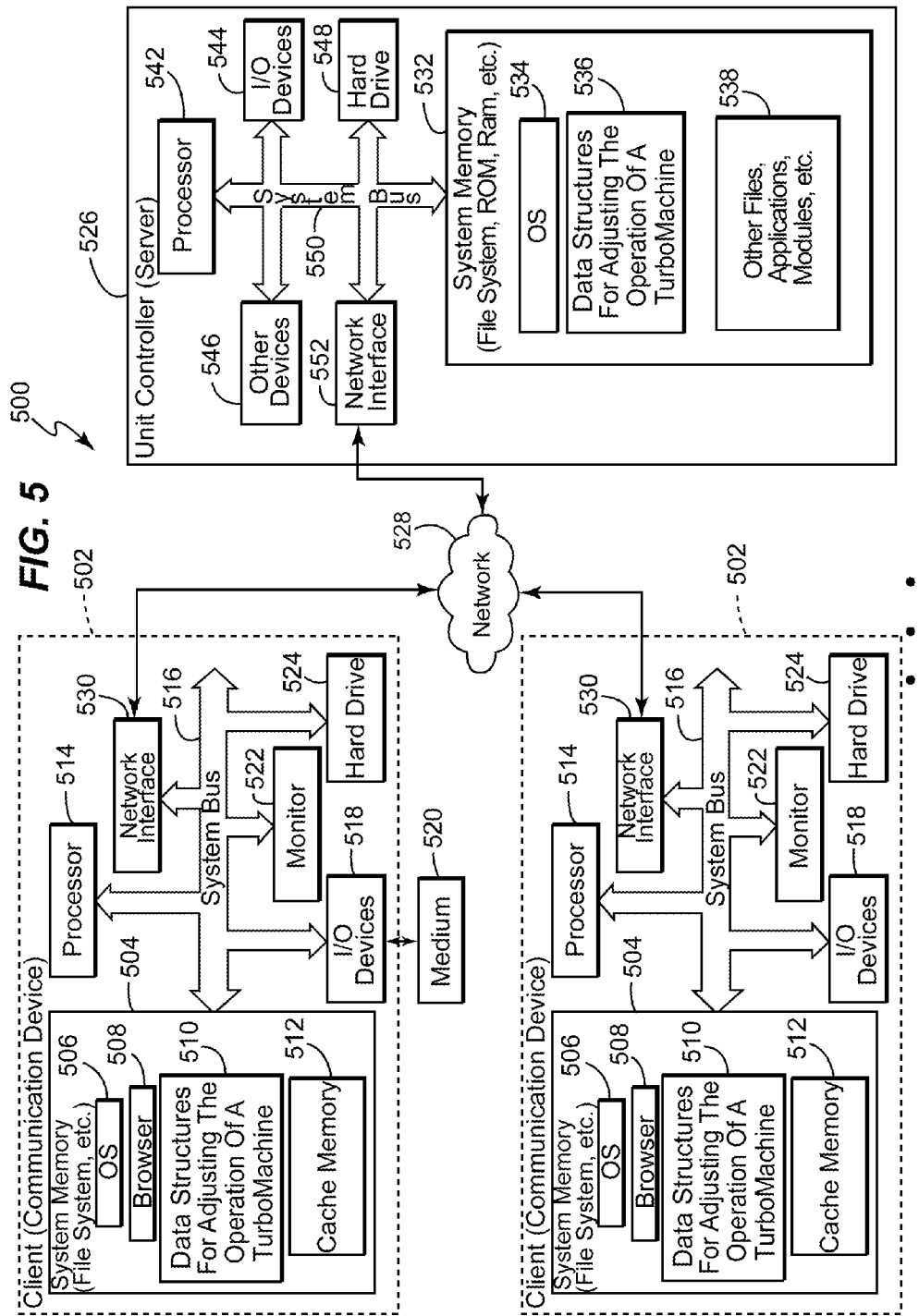
FIG. 5 is a block diagram of an exemplary system for adjusting the operation of a turbomachine in accordance with an embodiment of the present invention.

FIG. 5 is a block diagram of an exemplary system 500 for adjusting the operation of a turbomachine in accordance with an embodiment of the present invention. The elements of the methods 200, 300, and 400 may be embodied in and performed by the system 500. The system 500 may include one or more user or client communication devices 502 or similar systems or devices (two are illustrated in FIG. 5). Each communication device 502 may be for example, but not limited to, a computer system, a personal digital assistant, a cellular phone, or similar device capable of sending and receiving an electronic message.

The communication device 502 may include a system memory 504 or local file system. The system memory 504 may include for example, but is not limited to, a read only memory (ROM) and a random access memory (RAM). The ROM may include a basic input/output system (BIOS). The BIOS may contain basic routines that help to transfer information between elements or components of the communication device 502. The system memory 504 may contain an operating system 506 to control overall operation of the communication device 502. The system memory 504 may also include a browser 508 or web browser. The system memory 504 may also include data structures 510 or computer-executable code for adjusting the operation of a turbomachine that may be similar or include elements of the methods 200, 300, and 400 in FIGS. 2, 3, and 4, respectively.

The system memory 504 may further include a template cache memory 512, which may be used in conjunction with the methods 200, 300, and 400 in FIGS. 2, 3, and 4 for adjusting the operation of a turbomachine.

The communication device 502 may also include a processor or processing unit 514 to control operations of the other components of the communication device 502. The operating system 506, browser 508, and data structures 510 may be operable on the processing unit 514. The processing unit 514 may be coupled to the memory system 504 and other components of the communication device 502 by a system bus 516.

The communication device 502 may also include multiple input devices (I/O), output devices or combination input/output devices 518. Each input/output device 518 may be coupled to the system bus 516 by an input/output interface (not shown in FIG. 5). The input and output devices or combination I/O devices 518 permit a user to operate and interface with the communication device 502 and to control operation of the browser 508 and data structures 510 to access, operate and control the software to adjust the operation of a turbomachine. The I/O devices 518 may include a keyboard and computer pointing device or the like to perform the operations discussed herein.

The I/O devices 518 may also include for example, but are not limited to, disk drives, optical, mechanical, magnetic, or infrared input/output devices, modems or the like. The I/O devices 518 may be used to access a storage medium 520. The medium 520 may contain, store, communicate, or transport computer-readable or computer-executable instructions or other information for use by or in connection with a system, such as the communication devices 502.

The communication device 502 may also include or be connected to other devices, such as a display or monitor 522. The monitor 522 may permit the user to interface with the communication device 502.

The communication device 502 may also include a hard drive 524. The hard drive 524 may be coupled to the system bus 516 by a hard drive interface (not shown in FIG. 5). The hard drive 524 may also form part of the local file system or system memory 504. Programs, software, and data may be transferred and exchanged between the system memory 504 and the hard drive 524 for operation of the communication device 502.

The communication device 502 may communicate with a at least one unit controller 526 and may access other servers or other communication devices similar to communication device 502 via a network 528. The system bus 516 may be coupled to the network 528 by a network interface 530. The network interface 530 may be a modem, Ethernet card, router, gateway, or the like for coupling to the network 528. The coupling may be a wired or wireless connection. The network 528 may be the Internet, private network, an intranet, or the like.

The at least one unit controller 526 may also include a system memory 532 that may include a file system, ROM, RAM, and the like. The system memory 532 may include an operating system 534 similar to operating system 506 in communication devices 502. The system memory 532 may also include data structures 536 for adjusting the operation of a turbomachine. The data structures 536 may include operations similar to those described with respect to the methods 200, 300, and 400 for adjusting the operation of a turbomachine. The server system memory 532 may also include other files 538, applications, modules, and the like.

The at least one unit controller 526 may also include a processor 542 or a processing unit to control operation of other devices in the at least one unit controller 526. The at least one unit controller 526 may also include I/O device 544. The I/O devices 544 may be similar to I/O devices 518 of communication devices 502. The at least one unit controller 526 may further include other devices 546, such as a monitor or the like to provide an interface along with the I/O devices 544 to the at least one unit controller 526. The at least one unit controller 526 may also include a hard disk drive 548. A system bus 550 may connect the different components of the at least one unit controller 526. A network interface 552 may couple the at least one unit controller 526 to the network 528 via the system bus 550.

The flowcharts and step diagrams in the figures illustrate the architecture, functionality, and operation of possible implementations of systems, methods, and computer program products according to various embodiments of the present invention. In this regard, each step in the flowchart or step diagrams may represent a module, segment, or portion of code, which comprises one or more executable instructions for implementing the specified logical function(s). It should also be noted that, in some alternative implementations, the functions noted in the step may occur out of the order noted in the figures. For example, two steps shown in succession may, in fact, be executed substantially concurrently, or the steps may sometimes be executed in the reverse order, depending upon the functionality involved. It will also be noted that each step of the step diagrams and/or flowchart illustration, and combinations of steps in the step diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, it should be appreciated that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method of adjusting the operation of a turbomachine, wherein the turbomachine generates an exhaust stream and comprises an inlet section; the method comprising:
    providing at least one exhaust gas recirculation (EGR) system comprising: at least one EGR flow conditioning device and at least one flow control device; wherein the EGR recirculates the exhaust stream to the inlet section of the turbomachine;
    determining a composition of an inlet fluid; wherein the composition comprises at least one constituent; and
    adjusting an exhaust temperature setpoint of the turbomachine based on the composition of the inlet fluid.

2. The method of claim 1, wherein the at least one constituent comprises at least one of: SOx, NOx, $CO_2$, water, chloride ions, acids, aldehydes, hydrocarbons, or combinations thereof.

3. The method of claim 1, further comprising providing at least one notification.

4. The method of claim 1, wherein the step of determining the inlet fluid composition comprises utilizing a first EGR feedback device to measure an exhaust stream flowrate.

5. The method of claim 1, wherein the step of determining the inlet fluid composition comprises utilizing a first EGR feedback device to measure a concentration of the at least one constituent within the inlet fluid and a second EGR feedback device to measure a humidity concentration within the inlet fluid.

6. The method of claim 1, wherein the step of determining the inlet fluid composition comprises receiving data on an exhaust stream flowrate from a system, wherein the system comprises at least one of: an EGR control system, a turbine control system, a site control system, or combinations thereof.

7. The method of claim 1, further comprising receiving turbomachine operating data, wherein the turbomachine operating data comprises a compressor pressure ratio and an exhaust temperature.

8. The method of claim 7, further comprising a turbomachine operating model, wherein the turbomachine operating model receives the inlet fluid composition and the turbomachine operating data.

9. The method of claim 8, wherein the turbomachine operating model determines a replacement exhaust temperature setpoint.

10. The method of claim 9, further comprising applying the replacement exhaust temperature setpoint.

11. A method of adjusting the operation of a turbomachine, wherein the turbomachine generates an exhaust stream and comprises an inlet section, the method comprising:
    providing at least one exhaust gas recirculation (EGR) system comprising: at least one EGR flow conditioning device and at least one flow control device; wherein the EGR recirculates the exhaust stream to an inlet section of the turbomachine; and
    utilizing a turbomachine operating model for determining a firing temperature of the turbomachine, the turbomachine operating model incorporating a plurality of turbomachine operating data and determining an adjustment for an exhaust temperature setpoint of the turbomachine.

12. The method of claim 11, wherein the turbomachine operating model determines an EGR fraction.

13. The method of claim 11, wherein the plurality of turbomachine operating data comprises: a compressor pressure ratio, an exhaust temperature, turbomachine output data, and data on at least one EGR valve, and combinations thereof.

* * * * *